US012766802B2

(12) United States Patent
Bard et al.

(10) Patent No.: US 12,766,802 B2
(45) Date of Patent: Oct. 20, 2026

(54) METHOD FOR CONTROLLING A LAYING HEAD OF A TIRE COMPONENT WITH A SIMPLIFIED PATH

(71) Applicant: Compagnie Generale Des Etablissements Michelin, Clermont-Ferrand (FR)

(72) Inventors: Fabien Bard, Clermont-Ferrand (FR); Laurent Herbomel, Clermont-Ferrand (FR)

(73) Assignee: Compagnie Generale Des Etablissements Michelin, Clermont-Ferrand (FR)

( * ) Notice: Subject to any disclaimer, the term of this patent is extended or adjusted under 35 U.S.C. 154(b) by 331 days.

(21) Appl. No.: 18/266,420

(22) PCT Filed: Oct. 21, 2021

(86) PCT No.: PCT/FR2021/051852
§ 371 (c)(1),
(2) Date: Jun. 9, 2023

(87) PCT Pub. No.: WO2022/129708
PCT Pub. Date: Jun. 23, 2022

(65) Prior Publication Data
US 2024/0034016 A1 Feb. 1, 2024

(30) Foreign Application Priority Data
Dec. 18, 2020 (FR) ....................................... 2013656

(51) Int. Cl.
*B29D 30/60* (2006.01)
*B29D 30/16* (2006.01)
*B29D 30/08* (2006.01)

(52) U.S. Cl.
CPC ......... *B29D 30/60* (2013.01); *B29D 30/1628* (2013.01); *B29D 2030/082* (2013.01)

(58) Field of Classification Search
CPC ................ B29D 30/60; B29D 30/1628; B29D 2030/082
(Continued)

(56) References Cited

U.S. PATENT DOCUMENTS

2007/0199661 A1* 8/2007 Nicolas .............. B29D 30/1628 156/64
2021/0245465 A1 8/2021 Van Der Made et al.

FOREIGN PATENT DOCUMENTS

EP 1533107 A1 5/2005
WO 2019235932 A1 12/2019

* cited by examiner

*Primary Examiner* — Abbas Rashid
*Assistant Examiner* — Gregory C. Grosso
(74) *Attorney, Agent, or Firm* — Dickinson Wright PLLC

(57) ABSTRACT

The method includes a step (a) of geometric characterization of the profile, during which a first set of geometric remarkable points prepresenting the shape of the profile is provided. In a step (b) of functional characterization of the profile, a second set of functional remarkable points linked to the laying laws which specify the conditions for laying the tire component is provided. The remarkable points are stored in a path chart. At step (c) a series of equidistant virtual points, referred to as "potential guide points", is defined on the profile, from the first functional remarkable point to the last functional remarkable point. Then, at step (d), the size of the path chart is reduced by applying to the path chart one or more selection criteria in order to select some of the potential guide points and remarkable points.

11 Claims, 5 Drawing Sheets

(58) Field of Classification Search
USPC .......................................................... 156/64
See application file for complete search history.

METHOD FOR CONTROLLING A LAYING HEAD OF A TIRE COMPONENT WITH A SIMPLIFIED PATH

CROSS-REFERENCE TO RELATED APPLICATION

This application claims priority to and the benefit of PCT Patent Application No. PCT/FR2021/051852 filed on 21 Oct. 2021, entitled "METHOD FOR CONTROLLING A LAYING HEAD OF A TYRE COMPONENT WITH SIMPLIFIED PATH," and French Patent Application No. FR2013656FR2013656, filed on 18 Dec. 2020, entitled "METHOD FOR CONTROLLING A LAYING HEAD OF A TYRE COMPONENT WITH SIMPLIFIED PATH".

BACKGROUND

1. Field

The present disclosure relates to the field of manufacture of tires for vehicle wheels, and more particularly to the field of controlling laying heads intended for laying a tire component by winding on a rotary manufacturing support of core or drum type.

2. Related Art

It is known practice to manufacture a tire, in particular a pneumatic tire, by winding in helical turns on a core having a curved profile, of toroidal shape, a plurality of tire components, such as one or more continuous strips of raw rubber, that is to say unvulcanized rubber, for example a strip of raw rubber intended to form the tread of the tire, or one or more reinforcing strips containing continuous reinforcing threads oriented parallel to the longitudinal direction of the reinforcing strip, in order to form one or more reinforcing belts.

In this regard, it is known practice to use a robotic arm which carries a laying head designed to convey and lay the tire component in question on the core. Of course, it is then necessary to control the robotic arm in order to position, orient and move the laying head accordingly along the profile of the core, following a suitable laying path.

In this regard, it is sometimes difficult to find a good compromise between, on the one hand, laying accuracy, which requires multiplying the points used to define the laying path, and on the other hand the storage and computer processing capacities of the control unit that controls the robotic arm, which do not always make it possible to manage a large amount of data in real time.

Admittedly, smoothing algorithms are also known which make it possible, in particular by means of Bezier curves, to replace a succession of profile points with a path curve modelled by a parametric polynomial function, which allows a simplified approximation of the profile. Such Bezier curves have the main advantage of having continuity in their curvature, and therefore a curve with a smooth path.

That being the, such smoothing algorithms require relatively high computing power, and are in any case not suitable for the management of certain categories of robotic arms, in particular certain categories of six-axis anthropomorphic robotic arms, because the robotic arms are incapable of processing a setpoint of Bezier curve type and can only operate with servo-control "by segments", in other words with a setpoint expressed in the form of a path chart which lists in order all the successive points, in a finite number, which constitute the path to be followed.

SUMMARY

The subject matter associated with the disclosure consequently aims to remedy the abovementioned drawbacks and to propose a new method for defining a path of a laying head intended for laying tire components on a core, this method allowing servo-control by segments and in real time of a laying head with modest computer processing capabilities, while still guaranteeing satisfactory accuracy and quality of the laying operation.

The subject matter associated with the disclosure is achieved by means of a method for defining a path of a laying head, and a corresponding method for controlling a laying head, the laying head being intended for laying at least one tire component by winding the tire component in turns on a receiving face of a core rotated about its central axis, the receiving face having, along the central axis, a predetermined profile, the method comprising:

a step (a) of geometric characterization of the profile, during which the outline of the profile of the receiving face is provided and a first set of remarkable points, referred to as "geometric remarkable points", are isolated on this profile, these points being considered to be characteristic of the shape of the profile, and the geometric remarkable points are stored in the form of a set of path points referred to as the "path chart", a step (b) of functional characterization of the profile, during which a plurality of functional zones is determined on the profile, each of which extends from a zone start point to a zone end point, and a laying law is associated with each of the functional zones, which laying law specifies conditions for laying the tire component in the functional zone in question, and the zone start points and the zone end points, forming a second set of remarkable points referred to as "functional remarkable points", are inserted in the path chart, then a step (c) of meshing during which, with reference to a predetermined direction of travel of the profile, a series of equidistant virtual points, referred to as "potential guide points", which delimit in pairs line segments all having an identical length, equal to a predetermined chosen value, referred to as the "unit resolution pitch", is defined on the profile, from the first functional remarkable point, that is to say from the point at which the first functional zone begins, considered the origin, to the last functional remarkable point, that is to say to the point at which the last functional zone ends, and the potential guide points are inserted in the path chart, then a step (d) of simplification during which the size of the path chart is reduced by applying to the path chart one or more selection criteria in order to select at least some, and only some, of the potential guide points and geometric and functional remarkable points contained in the path chart, and by deleting the points not selected, in such a way as to obtain a simplified path chart, of reduced size, within which at least one, and preferably several, of the segments which connect the successive selected points in pairs have a length strictly greater than the chosen unit resolution pitch.

Advantageously, the method according to the disclosure makes it possible to clearly identify, and therefore to duly take into consideration, the remarkable points which require particular attention, whether to define the geometry of the profile, in particular in the portions of the profile where the profile has a certain geometric singularity such as a pronounced curvature, or to highlight functional singularities, in this case changes in the laying law, for example when the pitch or the speed of winding of the tire component is modified.

In addition, the mesh initially proposed by the method, thanks to the multiple potential guide points, offers the possibility of having particularly fine mesh whenever necessary.

Thus, depending on the situation in the profile portion concerned, it will be possible locally to:

- either keep and take advantage of the fineness of the mesh, by retaining a high density of selected points in order to maintain a fine resolution, using short segments having a length equal to the unit resolution pitch, and therefore in order to ensure good laying accuracy in the profile portion concerned; this will typically be applicable in the portions of the profile where there is a geometric or functional singularity, and more particularly, concretely, in the vicinity of the remarkable points;
- or, on the contrary, "relax", that is to say de-densify, the mesh by selecting and retaining only some of the potential guide points out of all the potential guide points available in the profile portion concerned, and therefore by lengthening in this profile portion the segments which separate two consecutive path points; this will typically be applicable in the portions of the profile which have less variability, in particular few or no changes in direction of the outline of the profile and a degree of constancy of the laying law.

By way of indication, it is possible to increase the density of selected points and thus define shorter segments in the portions of the profile which correspond to changes in the laying law and in the portions of the profile which have marked changes in direction, bending sharply, and therefore a small radius of curvature, as is particularly the case at the shoulders of the tire, that is to say in the transition zones between the crown of the tire which forms the tread and the sidewalls of the tire which connect the crown to the rim. It is also possible, conversely, to space out the selected points and therefore lengthen the segments in particular in the crown of the tire, which is almost flat and which corresponds to the tread.

Finally, by virtue of the disclosure, it will thus be possible to prepare, then transmit to the robotic arm, a path chart which will be particularly lightweight, since it contains relatively few points ultimately selected, but wherein the selected points will be distributed in such a way as to be concentrated in order to have a tighter mesh in the most complex and most difficult portions of the profile to create, so as to guarantee the great accuracy required in these portions, and conversely to be more spaced out in order to reduce the density of the mesh in simpler portions, which tolerate lower accuracy in the control of the path.

BRIEF DESCRIPTION OF THE DRAWINGS

Further subject matter, features and advantages of the disclosure will become apparent in greater detail upon reading the following description, with the aid of the appended drawings, which are provided purely by way of non-limiting illustration, in which.

DESCRIPTION OF EMBODIMENTS

Figure 1:
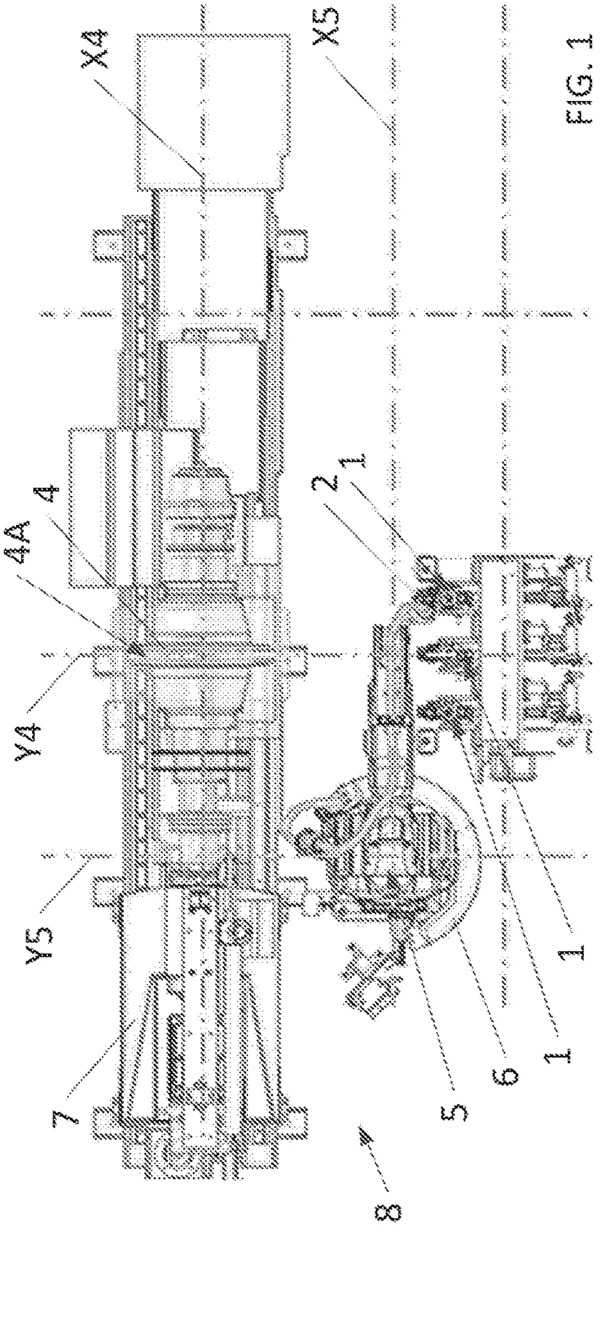
FIG. 1 shows, in atop view, a tire manufacturing facility capable of implementing a method according to the disclosure.

The present disclosure relates to a method for defining a path of a laying head 1.

The laying head 1 is intended for laying at least one tire component 2 by winding the tire component 2 in turns, preferably in turns which are contiguous or partially overlapping from one turn to another, on a receiving face 4A of a core 4 which is in turn rotated about its central axis X4.

The tire component 2 may be a continuous strip of raw rubber, or a continuous filamentary reinforcing element, which has a length which is much greater, in particular at least 100 times or even 1000 times greater, than its greatest transverse dimension. The continuous filamentary reinforcing element may be formed, for example, of a reinforcing thread or cord made of metal, glass fiber, or polymer chosen for its tensile strength, such as aramid, the thread or cord possibly being coated with raw rubber. As a variant, the continuous filamentary reinforcing element may be formed by a reinforcing strip comprising several continuous reinforcing threads or cords, made of metal, glass fiber, or polymer such as aramid, which are arranged parallel to one another in the longitudinal direction of the strip and embedded in a matrix, for example raw rubber or resin optionally itself coated with an overlayer of raw rubber.

The laying head 1 is carried by a robotic arm 5 movably mounted on a base 6.

The robotic arm 5 is preferably a six-axis anthropomorphic robotic arm. In a manner known per se, such a robotic arm 5 comprises a first joint referred to as the "shoulder", forming a connection comprising at least two orthogonal pivot axes between the base 6 and a first segment referred to as the "arm" which in turn carries a second joint referred to as the "elbow" preferably comprising at least one pivot axis to ensure the angular bending movement relative to the arm of a second segment referred to as the "forearm", the terminal end of which carries a third joint referred to as the "wrist", which is movable along three pivot axes that are orthogonal in pairs, one of which coincides with the longitudinal axis of the forearm, the wrist being designed to receive and carry the laying head 1.

The robotic arm 5, and therefore the path of the laying head 1, is controlled by an appropriate automatic control unit, such as a programmable logic controller.

The core 4 is carried by a frame 7 referred to as the "core frame" 7 and rotated about its central axis X4 relative to the core frame 7 by a suitable motorized drive device, preferably provided for this purpose with an electric motor.

Preferably, the facility 8 according to the disclosure, which comprises the core 4, the core frame 7 and the robotic arm 5, has several laying heads 1, which are interchangeable, as can be seen in FIG. 1.

Each of the laying heads 1 may advantageously be supplied with a different tire component.

The robotic arm 5 may thus select the head 2 which corresponds to the tire component to be laid, and if necessary change the laying head 1 during a manufacturing cycle, in order to be able to successively lay several tire components on the core 4.

Figure 2:
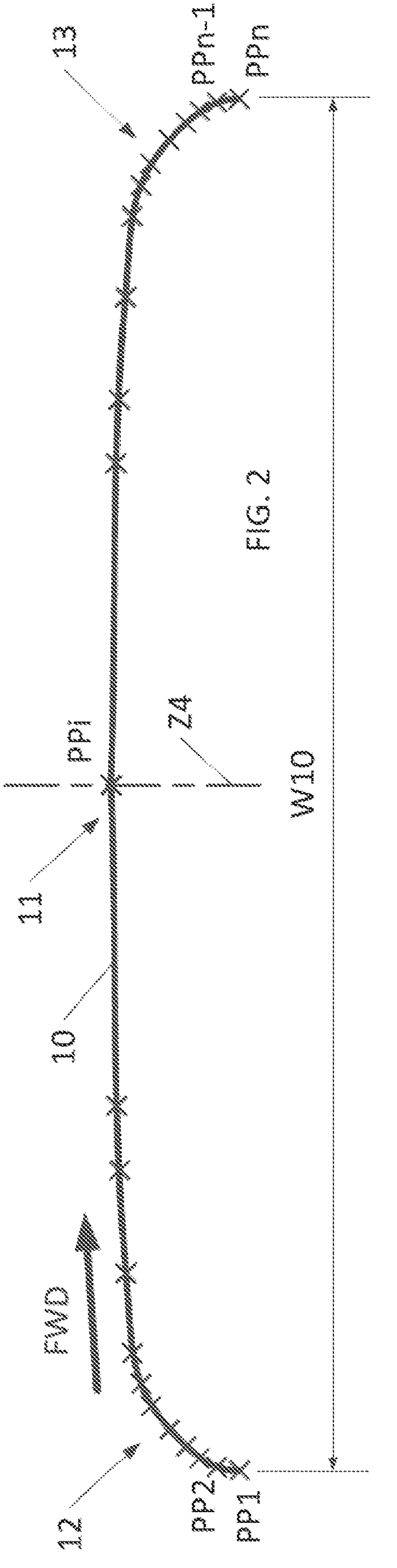
FIG. 2 shows an example of a profile of a receiving face of the core, corresponding to the cross section through said receiving face in a meridian plane of the core containing the central axis of said core, and on which a plurality of geometric remarkable points has been identified.

The receiving face 4A of the core has, along the central axis X4, a predetermined profile 10, as shown in FIG. 2.

The profile 10 corresponds to the intersection of the receiving face 4A with a sectional plane referred to as the "meridian plane" which contains the central axis X4.

As can be seen in FIGS. 1 and 2, the core 4 preferably has a shape of revolution around its central axis X4, and more particularly a toroidal shape, which gives the receiving face 4A a curved profile 10, in this case of convex curved shape, generally domed outwards.

Preferably, the profile 10 comprises a central zone which is almost flat and which corresponds to the crown 11 of the tire which will carry the tread and will come into contact with the road, this central zone being bordered, at each of its axial ends, by curved zones, the radius of curvature of which is within a range of values much lower than the range of values of the radius or radii of curvature of the crown 11. These curved zones correspond to the shoulders 12, 13 of the tire, i.e. the parts of the tire which form the transition between the crown 11 and the sidewalls of the tire which extend radially towards the central axis X4 before coming into engagement on a rim.

According to the disclosure, the method for defining the laying path comprises a step (a) of geometric characterization of the profile 10, during which the outline of the profile 10 of the receiving face 4A is provided and a first set of remarkable points PP1, PP2 . . . , PPi . . . , PPn−1, PPn, referred to as "geometric remarkable points" PP1, PP2 . . . , PPi . . . , PPn−1, PPn, are isolated on this profile 10, these points being considered to be characteristic of the shape of the profile 10, and therefore representative of the profile 10, and the geometric remarkable points PP1, PP2 . . . , PPi . . . , PPn−1, PPn are stored in the form of a set of path points referred to as the "path chart", as shown in FIG. 2.

The index "n" corresponds to an integer, and "i" designates the i-th point in the series of points, the value of i being between 1 and n.

The path chart contains at least the spatial coordinates of the geometric remarkable points, expressed in a frame of reference attached to the robotic arm 5, and more particularly attached to the fixed base 6 of the robotic arm 5, with respect to which the robotic arm 5 performs the movements of the laying head 1.

Note that, in absolute terms, the path chart, that is to say the set of path points, may take any suitable form, and more specifically any suitable form of digital data storage, for example the form of a list or a table. Particularly preferably, the path chart will take the form of a table, in which each path point will form a row of the table.

In all cases, the path points, and in this case in particular the rows of the table, will preferably be placed in the order in which the path points follow one another along the profile 10, with reference to a given direction of travel of the profile 10, denoted FWD, travelling along the profile 10 from one end of the profile 10 to the other. In other words, the path points contained in the path chart will preferably be ordered, in the path chart, in the direction of the curvilinear abscissae increasing along the profile 10.

The n geometric remarkable points PPi are therefore in this case stored in the path chart, preferably in the form of successive rows each corresponding to a remarkable point, in the order corresponding to the direction of travel FWD.

Preferably, as can be seen in FIG. 2, the smaller the radius of curvature of the profile 10, the closer together the geometric remarkable points PP1, PP2 . . . , PPi . . . , PPn−1, PPn, and therefore the shorter the adjacent segments of the profile 10 delimited in pairs by the geometric remarkable points. Thus, more geometric remarkable points will be taken into consideration, forming a tighter network, in the sharply curved portions of the profile 10, such as the shoulders 12, 13, while the geometric remarkable points will be spaced out in the straighter portions of the profile, such as the crown 11.

By way of indication, and in particular for profiles 10 which have an overall axial width W10 of between 150 mm and 370 mm, the number n of geometric remarkable points provided will preferably be between 20 and 60, more preferably between 30 and 40.

That being so, note that in the schematic example in FIG. 3 and subsequent figures, to simplify the description, use will be made of an intentionally shortened and simplified profile 10, on which only n=4 geometric remarkable points PP1, PP2, PP3, PP4 have been identified.

According to the disclosure, the method for defining the laying path also comprises a step (b) of functional characterization of the profile 10, during which a plurality of functional zones is determined on the profile, each of which extends from a zone start point to a zone end point, and a laying law is associated with each of the functional zones, which laying law specifies conditions for laying the tire component 2 in the functional zone in question, and the zone start points and the zone end points, forming a second set of remarkable points PF1, PF2 . . . , PFj . . . , PFm−1, PFm, referred to as "functional remarkable points" PF1, PF2 . . . , PFj . . . , PFm−1, PFm, are inserted in the path chart.

The index "m" corresponds to an integer, and "j" designates the j-th point in the series of points, the value of j being between 1 and m.

Typically, up to 20, 25 or even 30 functional zones may be provided. In practice, m may be between 3 and 30, more preferably between 5 and 10.

Preferably, during the step (b) of functional characterization of the profile, a laying law is associated with each of the functional zones, which laying law characterizes the conditions for laying the tire component in the functional zone in question by specifying the value, applicable and constant in the zone in question, of at least one laying parameter, preferably of several laying parameters, and even more preferably of all the laying parameters, from among:

(i) the nature of the tire component 2; for example, it may thus be specified whether a strip of raw rubber, a reinforcing thread, or a reinforcing strip is to be laid;

(ii) the laying pitch according to which the laying head 1 is offset with respect to the core 4 along the central axis between two successive turns; the laying pitch corresponds to the movement of the laying head along the profile per complete turn of the core, and therefore to the pitch of the helix formed by the tire component in question on the core, and for example it will be possible to define, by virtue of this laying pitch parameter, the degree of axial overlap between two consecutive turns of a rubber strip or of a reinforcing strip, and thus control the radial thickness of the layer resulting from the winding of the turns; note that, in absolute terms, it could be envisaged moving the core 4 axially with respect to the core frame 7 in order to create a relative axial movement of the core 4 with respect to the laying head 1; however, the core 4 will preferably be fixed axially, and it will be the relative axial movement generated solely by the movement of the laying head 1 that will thus make it possible to define and control the laying pitch;

(iii) the laying speed, which corresponds to the circumferential speed of the core 4 at which the tire component 2 is wound on the core; and/or (iv) the laying tension, which corresponds to the longitudinal tensile force exerted within the tire component 2 during laying, under the traction effect of the core 4 in rotation.

In practice, the functional remarkable points PF1, PF2 . . . , PFj . . . , PFm−1, PFm will mark the limits from which, along the profile 10, the execution of a laying law begins, the execution of a laying law ends, or the transition takes place between a first laying law and a second laying law which differs from the first laying law, and more particularly a second laying law which modifies the value of at least one of the laying parameters, or of several of the laying parameters, with respect to the first laying law which precedes it.

The laying laws will moreover establish, for example by specifying the laying pitch, a link between, on the one hand, the angular position and/or the angular speed of the core 4 with respect to its central axis X4 and, on the other hand, the position and the evolution of the position of the laying head 1 along the profile 10, to allow servoing of the movements of the laying head 1 as a function of the angular position of the core 4.

For convenience, the laying laws, and therefore the functional remarkable points PFj which characterize them, could be initially defined with reference to the curvilinear abscissa of the profile 10, which amounts to fictitiously considering the profile 10 in a rectilinear developed form, that is to say in the form of a fictitious line segment, and setting the functional remarkable points PFj as so many markers on the fictitious line segment. The spatial coordinates of the functional remarkable points PFj will then be determined by carrying out the reverse operation, i.e. by applying the developed form, bearing the points, to the actual, curved, outline of the profile 10.

Figure 3:
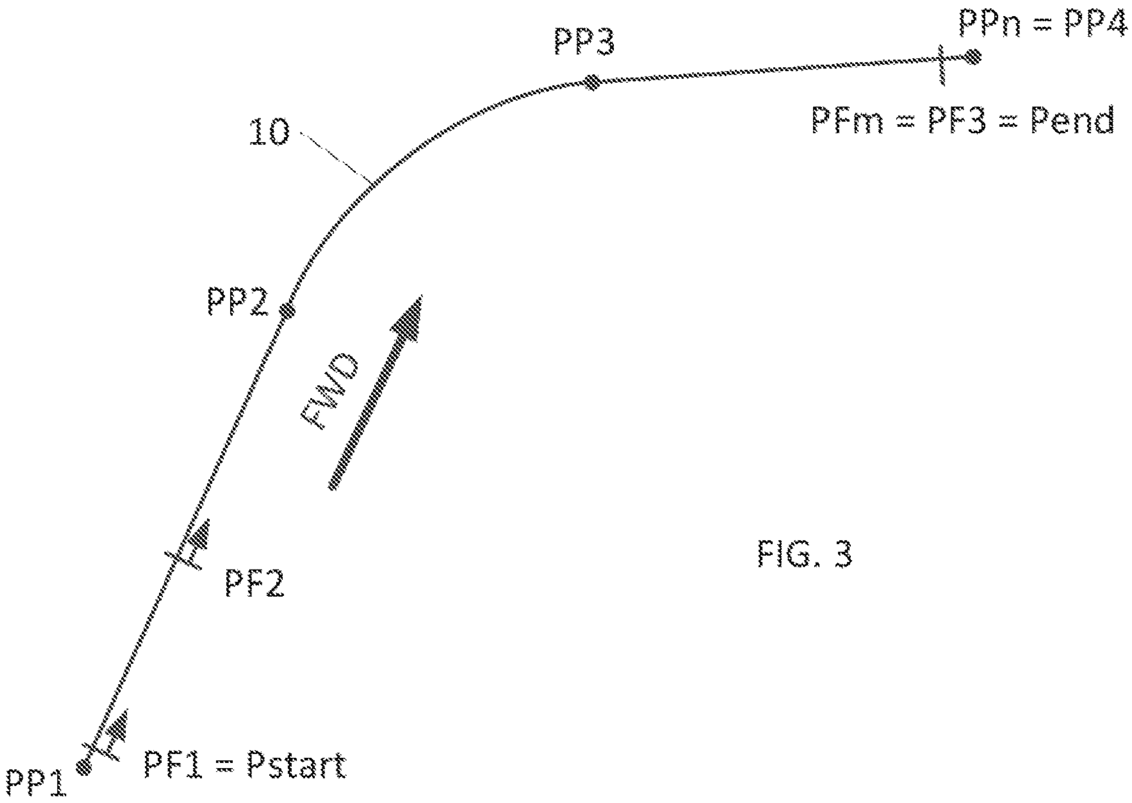
FIG. 3 shows a schematic view of a profile on which the geometric remarkable points and the functional remarkable points have been identified.

Note that, in the schematic example in FIG. 3, only m=3 functional remarkable points PF1, PF2, PF3 have been considered, in this case represented by dashes perpendicular to the profile, among which the first functional remarkable point PF1 forms a start point from which a first functional zone is entered and laying of a tire component 2 on the core 4 begins, in accordance with a first laying law, the second functional remarkable point PF2 indicates the entry into a second functional zone characterized by a modification of a laying parameter, for example a reduction in the laying pitch, such that a second laying law is applied from the second functional remarkable point PF2, and the third and final functional remarkable point PF3 indicates the arrival point where the laying operation ends, in this instance at the end of the second functional zone, and therefore in accordance with the second laying law.

Note that it is possible, in absolute terms, for one or more functional remarkable points PFj to coincide with one or respectively some of the geometric remarkable points PPi. However, preferably, at least some of the functional remarkable points PFj, where applicable more than half of the functional remarkable points PFj, or even all of the functional remarkable points PFj, will in principle be distinct from the geometric remarkable points PPi, as long as the definition of the laying laws and the adjustments in the successive laying laws, for example as regards the choice of the tire component 2 or the position from which laying of the tire component begins or ends, can in practice be associated with positions on the profile 10 which do not coincide with points defining the profile 10 in purely geometric terms.

Furthermore, while it is possible for the successive functional zones to be adjacent, in such a way as to cover the profile 10 continuously, it is also possible, in certain manufacturing cycles, to provide, between two portions of the profile 10 which must be covered by one or more tire components, a portion of the profile 10 referred to as the "coverage interruption zone" which must not be covered by any tire component during the manufacturing cycle in question, in which case there is a corresponding interruption interval between the two functional zones which respectively immediately precede and follow the coverage interruption zone, such that the successive functional zones are not, in fact, adjacent.

For convenience and conciseness in the description, the plural generic expression "remarkable points" or "geometric and functional remarkable points" may be used to refer indiscriminately to both the geometric remarkable points PPi and the functional remarkable points PFj, and more particularly to designate any set which groups together or is likely to group together both geometric remarkable points PPi and functional remarkable points PFj. Likewise, the generic expression "remarkable point" or "geometric or functional remarkable point" may be used to designate individually a remarkable point which may be either a geometric remarkable point PPi or a functional remarkable point PPj, depending on the context.

Figure 4:
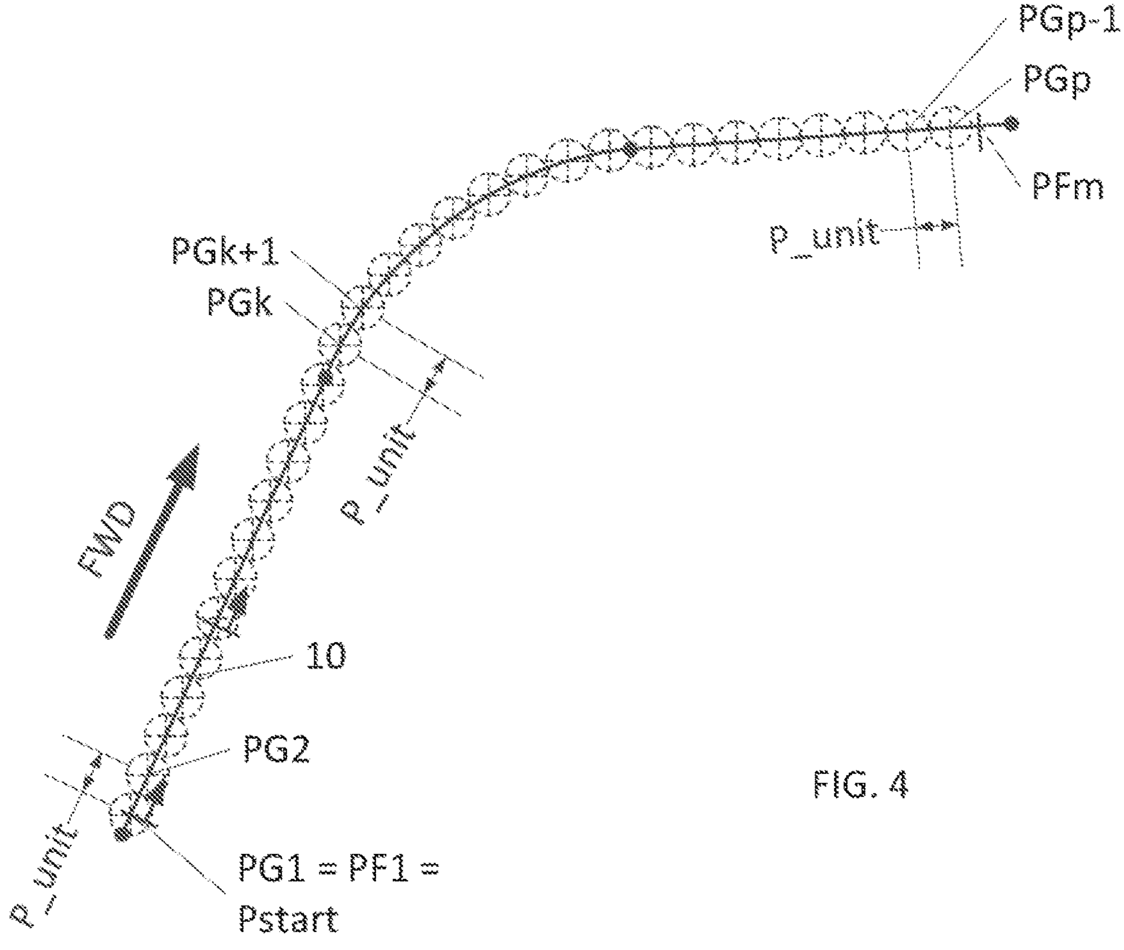
FIG. 4 shows, in a schematic view, the meshing step during which the profile of FIG. 3 is screened by means of a series of equidistant potential guide points.

According to the disclosure, the method for defining the laying path next comprises, after the identification of the geometric and functional remarkable points PPi, PFj, a step (c) of meshing during which, with reference to a predetermined direction of travel of the profile, in this case denoted FWD, a series of equidistant virtual points PG1, PG2 . . . , PGk . . . , PGp−1, PGp, referred to as "potential guide points" PG1, PG2 . . . , PGk . . . , PGp−1, PGp, which delimit in pairs line segments all having an identical length, equal to a predetermined chosen value, referred to as the "unit resolution pitch" P_unit, is defined on the profile 10, from the first functional remarkable point PF1, that is to say from the point at which the first functional zone begins, considered the origin, to the last functional remarkable point PFm, that is to say to the point at which the last functional zone ends, as shown in FIG. 4, and the potential guide points PG1, PG2 . . . , PGk . . . , PGp−1, PGp are inserted in the path chart.

The index "p" corresponds to an integer, and "k" designates the k-th point in the series of points.

Preferably, the value of the unit resolution pitch P_unit which separates, in pairs, the potential guide points PG1, PG2 . . . , PGk . . . , PGp−1, PGp created during the meshing step (c) is between 0.1 mm and 1 mm, for example equal to 0.5 mm.

Such a value will in fact make it possible to obtain a sufficiently fine resolution, and therefore sufficient accuracy, in the geometrically most complex portions of the profile 10, and/or in the most difficult functional zones, and therefore all the more so in the simpler portions of the profile 10. This value will therefore correspond to the optimum accuracy that the method can offer.

By way of indication, taking into account the developed length of the profile 10 and the unit resolution pitch P_unit envisaged, the initial number of potential guide points resulting from the "raw" meshing operation, that is to say the number p, may be between 500 (five hundred) and 8,000 (eight thousand), for example between 2,000 and 5,000.

At this stage, at the end of the meshing step (c), a "raw" path chart which contains, provisionally, all the geometric remarkable points PPi, all the functional remarkable points PFj, and all the potential guide points PGk, is thus in any case obtained.

By way of indication, the raw path chart may thus have at least 500 points, at least 1,000 (one thousand) points, even at least 2,000 (two thousand) points, and sometimes up to 8,000 (eight thousand) path points.

As mentioned above, it is however not necessary, in practice, to retain this homogeneous initial meshing over the entire profile 10, having a mesh which is very fine, equal to, or even locally less than, the unit resolution pitch P_unit. It is in fact possible to use a less fine resolution, and therefore a greater pitch, in the portions of the profile 10 in which the direction of the profile 10 and the laying law vary little or not at all, as long as no significant change affects the outline of the profile 10 or the laying law.

Out of all the potential guide points PGk initially available, provisionally inserted in the path chart, and more generally out of all the potential guide points PGk and geometric PPi and functional PFj remarkable points present in the path chart and thus constituting as many available path points, some will thus be effectively retained to form part of the final simplified path chart 20, and others will not, depending on their usefulness.

Figure 10:
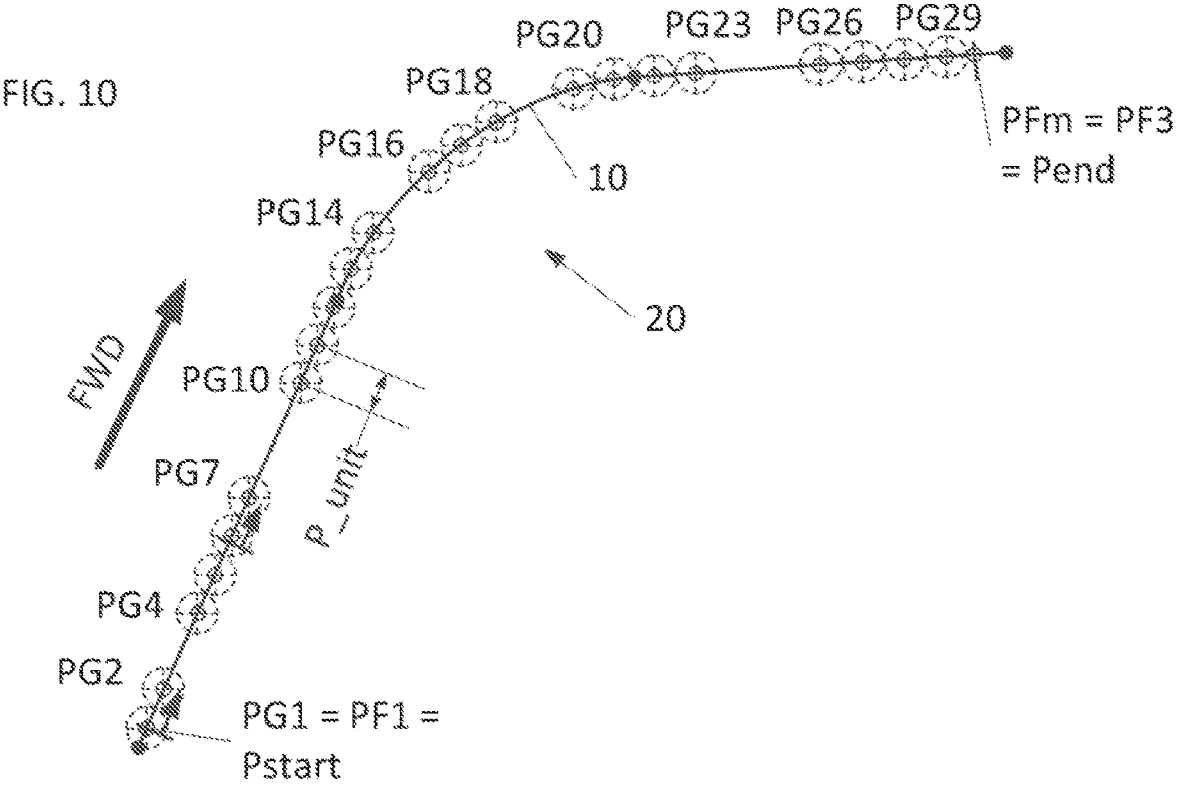
FIG. 10 shows the path which corresponds to the simplified path chart ultimately obtained after applying the above selection criteria to the profile of FIG. 3.

This is why, according to the disclosure, the method for defining the laying path next comprises, after the meshing step (c), a step (d) of simplification during which the size of the path chart is reduced by applying to the path chart one or more selection criteria in order to select at least some, and only some, of the potential guide points PGk and geometric and functional remarkable points PPi, PFj contained in the path chart, and by deleting the points not selected, in such a way as to obtain, as shown in FIG. 10, a simplified path chart 20, of reduced size, within which at least one, and preferably several, of the (line) segments which connect the successive selected points in pairs have a length strictly greater than the chosen unit resolution pitch P_unit.

Note that, in practice, the path points, and more particularly the potential guide points PGk, which correspond to singularities in the profile 10 or in the laying law will be retained in order to concentrate the accuracy, and therefore the available computing power, in the portions of the profile 10 which really need it.

From a formal point of view, the application of each selection criterion may be considered a sub-step of the simplification step (d).

By convention and for convenience in the drawings, the potential guide points PGk are drawn in dotted lines in FIGS. 3 to 10, and the points actually selected, and therefore present in the path chart at the time in question, are indicated by small circles in solid line with a blank centre. Arrows indicate the points which are added to the selection (also referred to as the "list of selected points") during the sub-step in question, according to the selection criterion applied.

Figure 5:
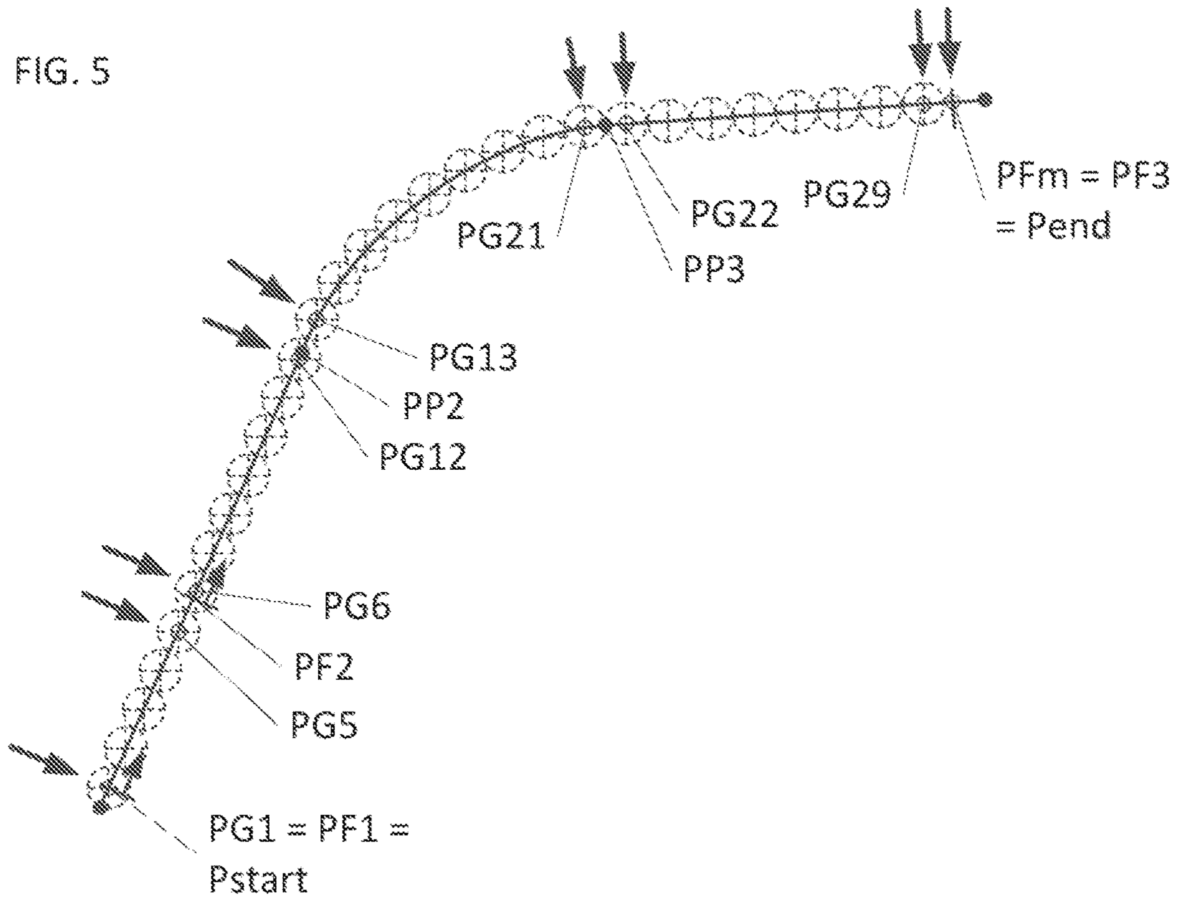
FIG. 5 shows the application of a first selection criterion during which the potential guide points which frame the remarkable points are selected on the profile of FIG. 4.

Preferably, during the simplification step (d), a, in this instance a first, selection criterion is applied, based on flanking, according to which, as can be seen in FIG. 5, the first functional remarkable point PF1 is selected, this being considered the start point Pstart of the laying path, the last functional remarkable point PFm is selected, this being considered the arrival point Pend of the laying path and, for at least one geometric or functional point PPi, PFj which is strictly between the start point Pstart and the arrival point Pend, and more preferably for each geometric or functional remarkable point PPi, PFj which is strictly between the start point Pstart and the arrival point Pend, in other words, here in this order PF2, PP2 then PP3 in the example of FIG. 5, out of the two potential guide points PGk which flank the geometric or functional remarkable point PPi, PFj, that is to say out of the potential guide point which immediately precedes and the potential guide point which immediately follows the geometric or functional remarkable point PPi, PFj, at least one of the two potential guide points PGk is selected, for example the one out of the two guide points PGk which is closest to the geometric or functional remarkable point PPi, PFj in question.

More preferably, for the at least one or respectively for each remarkable point PPi, PFj which is strictly between the start point Pstart and the arrival point Pend, each of the two potential guide points PGk which flank the geometric or functional remarkable point PPi, PFj in question, that is to say which in the case of one of them immediately precedes and for the other immediately follows the geometric or functional remarkable point PPi, PFj, is selected.

In FIG. 5, this amounts to selecting PG5, PG6, which flank PF2, then PG12 and PG13, which flank PP2, then PG21 and PG22, which flank PP3.

It will thus be possible to obtain accurate and balanced smoothing of the portions of the profile in which the remarkable points PPi, PFj are located, by selecting the two potential guide points PGk which are located on either side of the remarkable point PPi, PFj in question along the profile 10.

Such a selection will advantageously make it possible, without inducing any significant error when following the profile 10 and the laying laws, to substitute the remarkable point PPi, PFj with the corresponding pair of potential guide points PGk.

In this regard, note that, preferably, after having selected, in accordance with the flanking selection criterion, the potential guide point or preferably the potential guide points PGk flanking a geometric or functional remarkable point PPi, PFj strictly between the start point Pstart and the arrival point Pend, the geometric and functional remarkable point PPi, PFj in question is deleted.

More preferably, all the geometric and functional remarkable points PPi, PFj strictly between the start point Pstart and the arrival point Pend will be flanked by one or preferably by two potential guide points PGk according to this first selection criterion, such that all the geometric and functional remarkable points PPi, PFj strictly between the start point Pstart and the arrival point Pend will thus end up being deleted.

The abovementioned deletion amounts to "de-selecting" all the remarkable points PPi, PFj concerned by the flanking selection criterion, and therefore erasing from the path chart at least some, and preferably all, of the geometric and functional remarkable points PPi, PFj which are strictly between the start point Pstart and the arrival point Pend.

Such a deletion operation is advantageously made possible by the fact that the potential guide point or more likely the two potential guide points PGk selected in the vicinity of each geometric or functional remarkable point PPi, PFj in question are chosen from among the two potential guide points PGk which flank the remarkable point PPi, PFj and which are both at a very short distance from the remarkable point, in this case at a distance which is strictly less than the unit resolution pitch P_unit, such that there is no need to keep the remarkable point PPi, PFj to satisfy the desired requirement of accuracy. To be specific, once the potential guide point or points PGk have thus been selected, the geometric or functional remarkable point PPi, PFj giving rise to this selection in fact becomes redundant as regards the definition of the laying path, and may therefore be deleted without the risk of distorting the path or a laying law.

This deletion of the remarkable points PPi, PFj thus "flanked" by potential guide points PGk also makes it possible, by imposing a minimum separation pitch between two successive points, in this case by imposing a minimum distance equal to the unit resolution pitch P_unit between two potential guide points PGk thus selected, to guarantee that the control unit, and more specifically the computer controlling the robotic arm 5, will indeed be able to perceive in time, with regard to its refresh rate, all the points in the path chart, used as successive setpoints, when the laying head 1 is in motion, such that the servo-control of the robotic arm 5 will not be disrupted by too great a proximity between two points.

The deletion of the remarkable points PPi, PFj flanked by selected potential guide points PGk is preferably immediate, in such a way that the remarkable points PPi, PFj no longer participate as such in the subsequent selection of path points upon the application of the selection criteria which come after the application of the flanking selection criterion.

Furthermore, since it is rare for the last functional remarkable point PFm to coincide exactly with one of the virtual guide points PGk, and since, moreover, it is desirable to ensure the accuracy of the end of the laying operation, in particular in order to avoid any overshooting of the setpoint or too abrupt a slowing down of the laying head 1, the virtual guide point PGk which immediately precedes the last functional remarkable point PFm, in this case therefore PG29 in FIG. 5, will also preferably be selected, still according to this same flanking criterion, while also retaining, as stated above, the last functional remarkable point PFm, which constitutes the arrival point Pend.

Figure 6:
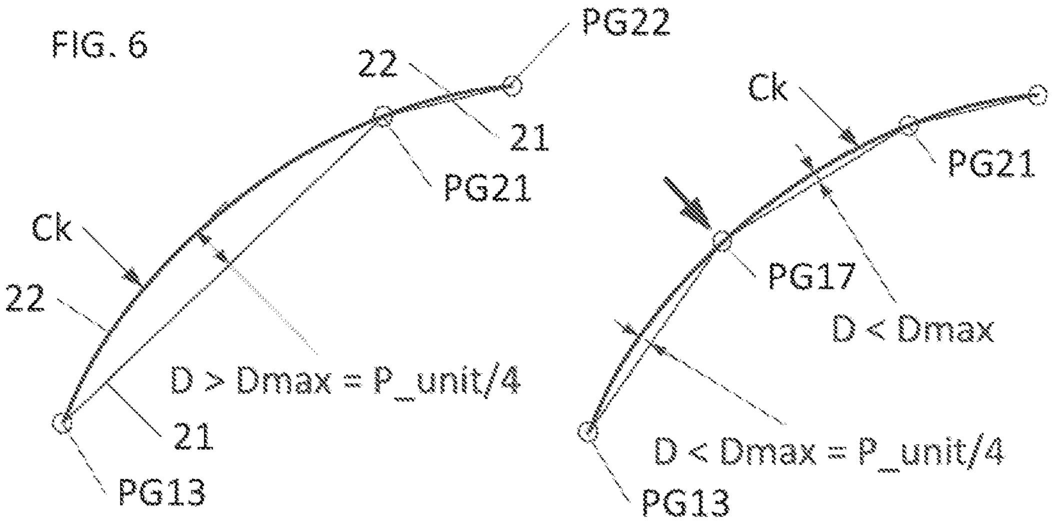
FIG. 6 shows, in a schematic view, the principle of a second selection criterion, based on an authorized deviation limit, according to which it is ensured that, for each trio of points selected, the two adjacent line segments which connect consecutive selected points in pairs do not deviate from the corresponding interpolation circle by more than a predetermined allowable deviation value.
Figure 7:
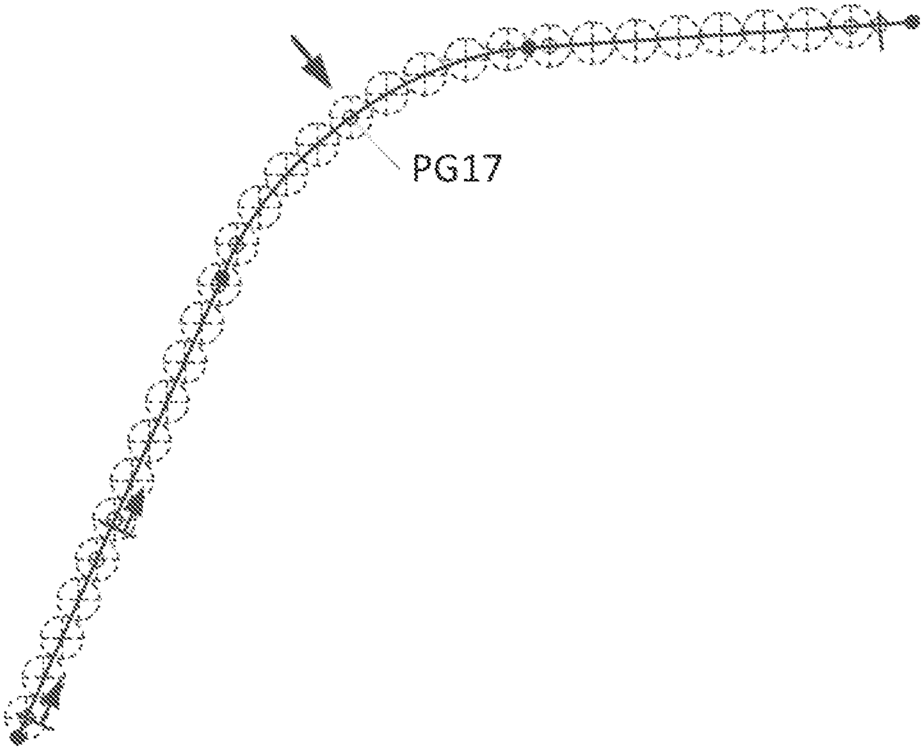
FIG. 7 shows the application of the second selection criterion by authorized deviation limit, and the addition of the corresponding selected points, to the profile of FIG. 5.

Preferably, during the simplification step (d), and more preferably following the application of the first flanking selection criterion described above, a, in this case a second, selection criterion is applied, namely a selection criterion based on an authorized deviation limit, according to which account is taken, for each pair of adjacent line segments defined by each trio of successive points already selected, for example the trio PG13, PG21, PG22 in FIGS. 5 to 7, of the interpolation circle Ck which passes through the three points of the trio and, for each of the two line segments 21 delimited by two successive points of the trio of points, the deflection D is calculated between the line segment 21, forming an arc chord 21, and the arc 22 of the interpolation circle which corresponds to it, that is to say the greatest distance D measured perpendicularly to the line segment 21 and separating the arc 22 from the line segment 21, as shown in FIG. 6, and, if the deflection D calculated for the segment 21 exceeds a predefined maximum authorized deviation value Dmax, the intermediate potential guide point PGk, or one of the intermediate potential guide points PGk, located between the potential guide points forming the ends of the segment 21 in question, is added to the list of selected points, as can be seen in FIGS. 6 and 7.

Preferably, the potential guide point PGk located closest to the middle of the line segment 21 in question is thus added to the list of selected points.

In the example of FIGS. 6 and 7, this is the potential guide point PG17.

Advantageously, it is thus possible to add a path point, and therefore bring the corresponding deviation down to zero, precisely at the location, or at least close to the location, where the deviation between the arc 22 of the interpolation circle and the arc chord segment 21 is initially the greatest.

Of course, after having added a point to the selection, it is possible to reiterate the application of the authorized deviation limit selection criterion in order to ensure that the new division into segments incorporating the added points satisfies the criterion, and if necessary proceed to add a new point to ensure sufficient proximity between the segments (arc chords) and the interpolation circles.

It will thus be ensured that the path formed by the polyline made up of the set of selected points, and therefore the succession of adjacent line segments which link these selected points in pairs, will always pass sufficiently close to the actual outline of the profile 10, and will therefore constitute an acceptable approximation of the profile 10.

Preferably, the maximum authorized deviation value Dmax will be chosen equal to a quarter of the unit resolution pitch: Dmax=P_unit/4.

This will allow the path in segments to never deviate significantly from the profile 10.

Figure 8:
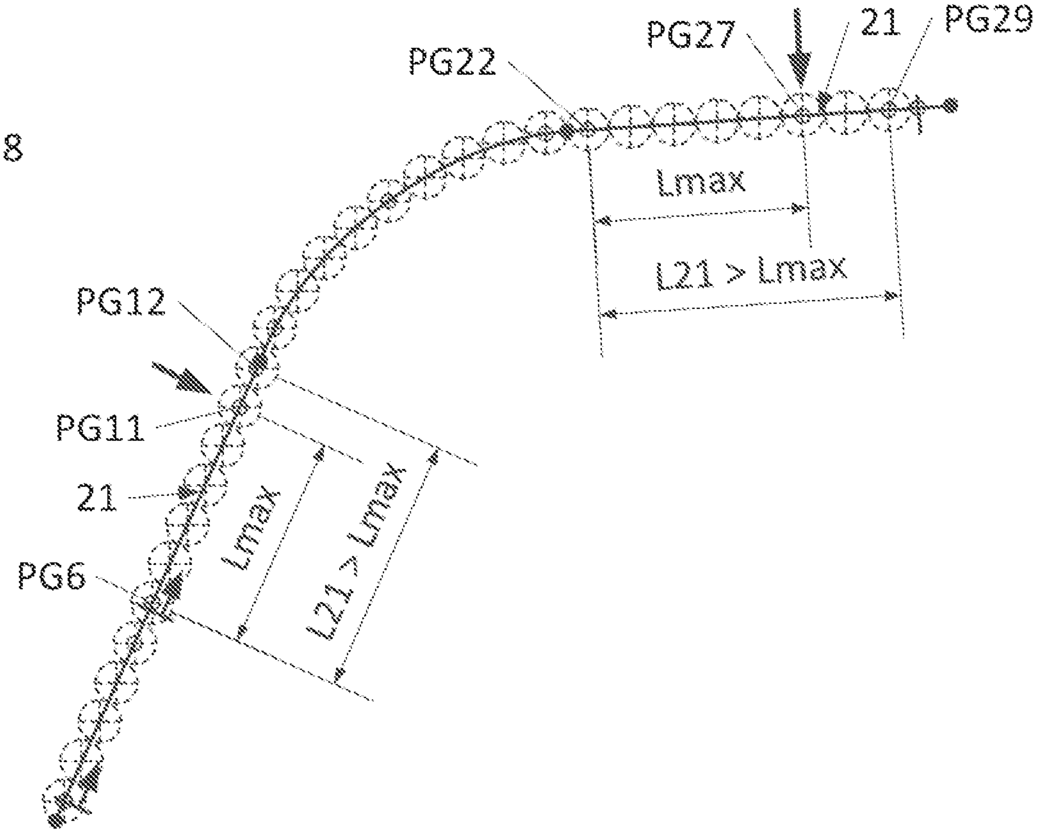
FIG. 8 shows the application to the profile of FIG. 7 of a third selection criterion, based on a maximum authorized segment length, according to which intermediate potential guide points are added to the selection upon the detection of a segment connecting two selected points which has a length exceeding a maximum allowable length value.

Preferably, during the simplification step (d), and more preferably following the application of the second authorized deviation limit selection criterion, a, in this case a third, selection criterion is applied, namely a selection criterion based on a maximum authorized segment length, according to which, as can be seen in FIG. 8, the length L21 of each line segment 21 having two successive points already selected as its ends is calculated and, if the calculated length L21 exceeds a predefined maximum authorized length value Lmax, one of the potential guide points PGk located strictly between the two points forming the ends of the segment 21 in question is added to the list of selected points, as can be seen in FIG. 8.

In the example of FIG. 8, the two segments 21 which initially exceed the maximum authorized length Lmax are the segment joining PG6 to PG12, and the segment joining PG22 to PG29. This leads to the addition of PG11 and PG27, respectively, to the selection.

Preferably, the point added, in accordance with this third selection criterion based on maximum authorized segment length, is either the potential guide point PGk which forms with the potential guide point PGk forming the start end of the segment 21 in question the largest segment having a length less than or equal to the maximum authorized length value Lmax, as can be seen in FIG. 8, or, as a variant, the potential guide point PGk located closest to the middle of the line segment 21 in question.

Here again, it will of course be possible to reiterate this third length limitation criterion as many times as necessary to arrive at a path in which all the segments satisfy the third criterion, that is to say all have a length less than or equal to the maximum authorized length Lmax.

Limiting the maximum allowable length for the segments, i.e. the value of "freefall" of the laying head 1, prevents the laying head 1 travelling too great a distance blindly, and therefore in particular prevents the risks or consequences of a possible overshoot or a possible drift of the actual path of the laying head 1 with respect to the path specified by the segments in the path chart and, more generally, with respect to the profile 10.

The maximum authorized length value Lmax may be set as a distance or, optionally, in a substantially equivalent manner, as the maximum authorized number of potential guide points not yet selected present between two points already selected, that is to say in terms of the extent of "empty" mesh space between two points already selected.

By way of indication, the maximum authorized length Lmax chosen may be between 10 mm and 50 mm.

Preferably, during the simplification step (d), and more preferably after having applied the various selection criteria described above, a, in this case a fourth, selection criterion is applied, namely a selection criterion based on level of quality, according to which the N potential guide points which immediately precede and the N potential guide points which immediately follow each of the points already selected are added to the points already selected, N being an integer, preferably zero by default, the value of which is set by the user.

The value of N will preferably be adjusted empirically, and more particularly increased, for example brought to the value 1 or 2, preferably on the basis of a test in which a tire is manufactured using the simplified path chart obtained following the application of the preceding criterion or criteria, in this case the first, second and third selection criteria, then the quality of the tire obtained is assessed and, if the quality is deemed insufficient, the value N is incremented by one unit.

This selection criterion based on level of quality will advantageously make it possible to improve the quality of the finish, in particular the appearance of the tire and the quality of the join between successive turns, in particular in the portions of the profile 30 which are affected by changes in direction (bends).

Figure 9:
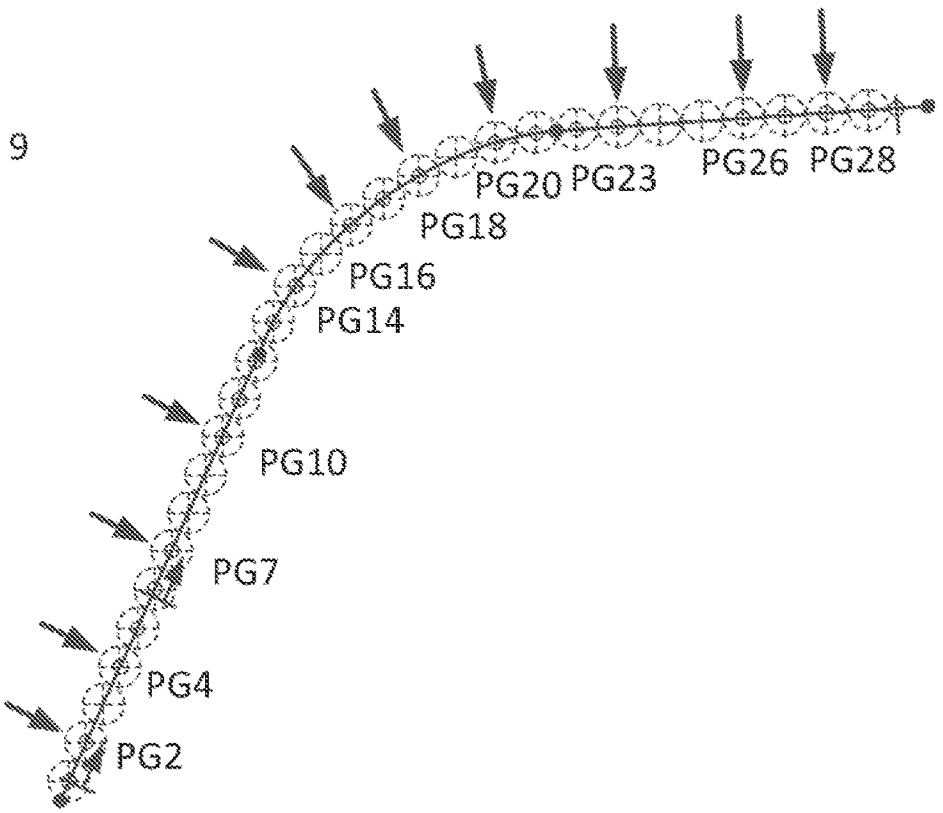
FIG. 9 shows the application to the profile of FIG. 8 of a fourth selection criterion, based on level of quality, during which the potential guide points which are immediately next to the points already selected are added to the selection of points of FIG. 8.

Specifically, if N=1, as in the example shown in FIG. 9, then any potential guide point PGk which is immediately next to a point already previously selected, here in application of one of the first, second and third selection criteria mentioned above, is added to the path chart.

In this case, this will therefore amount to adding to the selection the potential guide points PG2, PG4, PG7, PG10, PG14, PG16, PG18, PG20, PG23, PG26 and PG28.

All the points which have not been selected following the application of the selection criterion or criteria are then deleted. In particular, at least all the potential guide points PGk which have not been selected are thus deleted, and preferably both the potential guide points PGk which have not been selected and the geometric PPi and functional PFj remarkable points which have not been selected.

Ultimately, a simplified path chart 20 is therefore obtained, as shown in FIG. 10, in which only some of the remarkable points PPi, PFj, and above all of the potential guide points PGk, have been retained, and more particularly in this case in which only the first and last functional remarkable points PF1, PFm=PF3 on the one hand, and some of the potential guide points on the other hand, as identified by the first, second, third and fourth selection criteria above, applied in that order, have been retained as definitive path points.

In the example of FIGS. 3 to 10, in addition to the functional remarkable points PF1=Pstart and PF3=Pend, the following series of potential guide points will thus have been retained: PG1 (which by definition coincides with PF1) to PG2, PG4 to PG7, PG10 to PG14, PG16 to PG18, PG20 to PG23, and PG26 to PG29, which immediately precedes PF3.

The "gaps" separating the series of points from one another constitute, correspondingly, streamlining of the path chart.

By way of indication, note that the number of path points finally selected, and therefore the total number of path points stored, in the form of table rows, in the simplified path chart 20, is preferably between 150 (one hundred and fifty) points and 1,000 (one thousand) points.

In any event, the streamlining ratio, which is equal to the ratio between the size of the simplified path chart 20 obtained after application of the selection criteria and the size of the "raw" path chart resulting from the meshing step (c), that is to say the ratio between the number of path points finally selected and therefore contained in the simplified path chart 20, on the one hand, and the potential maximum number of path points represented by the sum of all the remarkable points PPi, PFj and all the potential guide points PGk initially available at the end of the raw meshing step (c), on the other hand, is preferably substantially between 1/10 and 1/30, i.e. a reduction in the size of the path chart by a factor of 10, 20, or even 30.

The method according to the disclosure is therefore particularly effective in streamlining the servo-control of the laying head 1 while maintaining excellent control of the laying path.

Of course, the disclosure relates as such to a method for manufacturing a tire during which a simplified path chart 20 is established in accordance with a path definition method according to any one of the possibilities described above, and the simplified path chart 20 is transmitted to a robotic arm 5 carrying the laying head 1, such that the robotic arm 5 executes the simplified path chart 20 using as setpoint the succession of segments which connect the successive selected points stored in the simplified path chart 20.

Preferably, the simplified path chart 20 associates each of its selected points with an absolute angle of rotation of the core 4 and, during the rotation of the core 4 about its central axis X4, the absolute angle of rotation travelled in rotation by the core 4 from a predefined origin is measured, and the position given by the robotic arm 5 to the laying head 1 is slaved to the angle of rotation of the core.

The simplified path chart 20 may advantageously be presented for this purpose in the form of a table comprising the points stored in the form of rows, the input value of which, typically the value stored in the first column of each row, will indicate the angle of rotation corresponding to the point in question.

The angular position of the core may be encoded by any appropriate sensor associated with the central axis X4, such as an encoder of resolver type.

Each row will preferably include the target coordinates (X, Y, Z) for the laying head 1 expressed on each of the three axes of the Cartesian frame of reference (X5, Y5, Z5) attached to the base 6 of the robotic arm 5, together with, where applicable, the angular orientation (W, P, R) of the laying head 1 in yaw, in roll, and possibly in pitch, in the frame of reference.

By convention, the "roll" will allow the laying head to tilt laterally (in this case about the axis Y4, with which the axis Y5 coincides) so as to be tangential to the curvature of the profile 10 such that this curvature is drawn in a meridian plane containing the central axis X4 and passing through the point of contact between the laying head 1 and the receiving face 4A of the core 4, while the "yaw" will correspond to the rotation about the axis (in this case radial, and more particularly vertical) which is normal to the receiving face 4A at the point of contact between the laying head 1 and the receiving face 4A, and will make it possible to orient the tire component 2 such that the longitudinal direction of the tire component 2 coincides with the direction that the desired helix angle for winding forms with respect to the circumferential direction of the core 4.

It is thus possible, for example, to proceed as follows:

The control unit establishes, in accordance with the path definition method described above, a simplified path chart 20, then transmits the simplified path chart 20 to the robotic arm 5, and requests that the robotic arm 5 execute the following of the points contained in the simplified path chart 20. Note that, as stated above, the robotic arm 5 has a basic intelligence, that is to say its own means of computation and data storage, existing but limited, which allow it to execute, in the form of linear segments, following of a setpoint from one point to the next, provided in the form of a path chart.

Once the control unit has calculated the angular position of the core 4 which must be reached so as to begin the laying operation, that is to say the angular position which corresponds to the start point Pstart of the first functional zone, the control unit initiates rotation of the core 4.

At a predetermined refresh rate, the robotic arm 5 reads the angular position of the core 4 using the encoder.

As a function of the feedback on the angular position of the core 4, the robotic arm 5 searches the simplified path chart 20 for the row in which it is located, and therefore for the setpoint coordinates applicable at the instant in question.

Once the row has been identified, the robotic arm 5 reads, in its own frame of reference (X5, Y5, Z5), the coordinates X, Y, Z, W, P and R which correspond to its actual position, and more particularly to the actual position and orientation of the laying head 1.

The robotic arm 5 then determines, by comparing the setpoint coordinates supplied by the row of the simplified path chart 20, on the one hand, with the coordinates of its own actual position on the other hand, the distance (linear on the positioning axes X5, Y5, Z5, angular for orientation rotations in roll, yaw, or pitch) it must travel to reach the coordinates X, Y, Z, W, P and R given in the simplified path chart.

The robotic arm 5 then executes a linear movement to reach the setpoint coordinates, that is to say to reach the path point specified in the simplified path chart, and therefore to place the laying head 1 in the desired configuration.

This cycle starts again until the core 4 reaches the calculated final angular position, that is to say the arrival point Pend of the laying path, at the end of the last functional zone, and the robotic arm 5 consequently reaches the last point (in this case the last row) in its simplified path chart 20.

Furthermore, according to a preferred feature which may constitute an disclosure in its own right, the manufacturing method may comprise, preferably prior to the execution of the simplified path chart 20, and more generally prior to the execution of any path chart, a calibration step during which, using a laser tacheometer mounted on a station which is located at a chosen reference location, and which is separate from the frame 7 referred to as the "core frame" 7 which carries the core 4 and the device for rotating the core 4, and which is also separate from the base 6 of the robotic arm 5, the position of three target points on the core frame 7 is measured in order to identify a first Cartesian frame of reference (X4, Y4, Z4), referred to as the "core frame of reference", attached to the core frame, with respect to the location of the laser tacheometer station, and then a target, such as a corner cube, is fixed at the location of the robotic arm 5 intended to receive the laying head 1, in this case on the wrist, then the robotic arm 5 is moved in such a way as to successively position the target at three different points in space, and the position of the target is measured each time so as to identify, with respect to the same location of the laser tacheometer station, a second Cartesian frame of reference (X5, Y5, Z5), referred to as the "robot frame of reference", attached to the robotic arm 5, and more specifically to the fixed base 6 of the robotic arm 5, and the robotic arm 5 is calibrated in such a way as to superimpose the robot frame of reference (X5, Y5, Z5) with the core frame of reference (X4, Y4, Z4), and thus make the orthonormal axes of the frames of reference coincide: X4 with X5, Y4 with Y5, Z4 with Z5.

Naturally, the disclosure is not limited only to the variant embodiments described above, and a person skilled in the art could in particular isolate or freely combine the abovementioned features, or replace them with equivalents.

The invention claimed is:

1. A method for controlling a laying head with a robotic arm for laying at least one tire component by winding said tire component in turns on a receiving face of a core rotated about its central axis, said receiving face having, along said central axis, a predetermined profile, said method comprising: a step (a) of establishing a geometric characterization of the profile with a control unit, during which the outline of the profile of the receiving face is provided and a first set of remarkable points, referred to as "geometric remarkable points", are isolated on this profile, these points being considered to be characteristic of the shape of said profile, and said geometric remarkable points are stored by the control unit in the form of a set of path points referred to as the "path chart", a step (b) of establishing a functional characterization of the profile with the control unit, during which a plurality of functional zones is determined by the control unit on the profile, each of which extends from a zone start point to a zone end point, and a laying law is associated with each of said functional zones, which laying law specifies conditions for laying the tire component with the laying head in the functional zone in question, and said zone start points and said zone end points, forming a second set of remarkable points referred to as "functional remarkable points", are inserted in the path chart, then a step (c) of performing a meshing with the control unit during which, with reference to a predetermined direction of travel of the profile, a series of equidistant virtual points, referred to as "potential guide points", which delimit in pairs line segments all having an identical length, equal to a predetermined chosen value, referred to as the "unit resolution pitch", are defined on the profile, from a first functional remarkable point, that is to say from the point at which the first functional zone begins, considered the origin, to a last functional remarkable point, that is to say to the point at which the last functional zone ends, and said potential guide points are inserted in the path chart, then a step (d) of performing a simplification with the control unit during which the size of the path chart is reduced by applying to the path chart one or more selection criteria in order to select at least some, and only some, of the potential guide points and geometric and functional remarkable points contained in the path chart, and by deleting the points not selected, in such a way as to obtain a simplified path chart, of reduced size, within which at least one segment which connects successive selected points in pairs has a length strictly greater than the chosen unit resolution pitch, and the simplified path chart is transmitted by the control unit to the robotic arm carrying the laying head, whereupon, said robotic arm executes the winding of the tire component on the receiving face of the core rotated about its central axis in accordance with said simplified path chart using as setpoints the succession of the at least one segment which connects the successive selected points stored in said simplified path chart.

2. The method according to claim 1, wherein during the simplification step (d), a selection criterion is applied, based on flanking, according to which the first functional remarkable point is selected, this being considered the start point of the laying path, the last functional remarkable point is selected, this being considered the arrival point of the laying path and, for at least one geometric or functional remarkable point which is strictly between the start point and the arrival point, out of the two potential guide points which flank said geometric or functional remarkable point, that is to say out of the potential guide point which immediately precedes and the potential guide point which immediately follows said geometric or functional remarkable point, at least one of said two potential guide points is selected, for example the one out of said two guide points which is closest to the geometric or functional remarkable point in question.

3. The method according to claim 2, wherein, for the at least one or respectively for each geometric or functional remarkable point which is strictly between the start point and the arrival point, each of the two potential guide points which flank, that is to say which in the case of one of them immediately precedes and for the other immediately follows said geometric or functional remarkable point, is selected.

4. The method according to claim 2, wherein after having selected, in accordance with the flanking selection criterion, the potential guide point or points flanking a geometric or functional remarkable point strictly between the start point and the arrival point, the geometric and functional remarkable point in question is deleted.

5. The method according to claim 1, wherein, during the simplification step (d), a selection criterion based on an authorized deviation limit is applied, according to which account is taken, for each pair of adjacent line segments defined by each trio of successive points already selected, of the interpolation circle which passes through the three points of said trio and, for each of the two line segments delimited by two successive points of said trio of points, the deflection is calculated between said line segment, forming an arc chord, and the arc of the interpolation circle which corresponds to it and, if said deflection calculated for said segment exceeds a predefined maximum authorized deviation value, the intermediate potential guide point or one of the intermediate potential guide points located between the potential guide points forming the ends of the segment in question, is added to the list of selected points.

6. The method according to claim 1, wherein, during the simplification step (d), a selection criterion based on a maximum authorized segment length is applied, according to which the length of each line segment having two successive points already selected as its ends is calculated and, if said calculated length exceeds a predefined maximum authorized length value, one of the potential guide points located strictly between the two points forming the ends of the segment in question.

7. The method according to claim 1 wherein, during the simplification step (d), a selection criterion based on level of quality is applied, according to which the N potential guide points which immediately precede and the N potential guide points which immediately follow each of said points already selected are added to the points already selected, N being an integer, the value of which is set by the user, wherein said value of N may be adjusted empirically, and more particularly increased, for example brought to the value 1 or 2, the quality of the tire obtained is assessed and, if said quality is deemed insufficient, the value N is incremented by one unit.

8. The method according to claim 1 wherein the value of the unit resolution pitch which separates, in pairs, the potential guide points created during the meshing step (c) is between 0.1 mm and 1 mm, for example equal to 0.5 mm.

9. The method according to claim 1 wherein during the step (b) of functional characterization of the profile, a laying law is associated with each of the functional zones, which laying law characterizes the conditions for laying the tire component in the functional zone in question by specifying the value, applicable and constant in the zone in question, of at least one laying parameter, from among: (i) the nature of the tire component, (ii) the laying pitch according to which the laying head (1) is offset with respect to the core along the central axis between two successive turns, (iii) the laying speed, which corresponds to the circumferential speed of the core at which the tire component is wound on said core, and/or (iv) the laying tension, which corresponds to the longitudinal tensile force exerted within the tire component during laying, under the traction effect of the core in rotation.

10. The method for manufacturing a tire according to claim 1, wherein the simplified path chart, via the control unit, associates each of its selected points with an absolute angle of rotation of the core, in that during the rotation of the core about its central axis, as initiated by the control unit, the absolute angle of rotation travelled in rotation by said core from a predefined origin is measured, and in that the position given by the robotic arm to the laying head is slaved to the angle of rotation of the core.

11. The method for manufacturing a tire according to claim 1, wherein it comprises a calibration step during which, using a laser tacheometer mounted on a station which is located at a chosen reference location, and which is separate from a frame referred to as "core frame" which carries the core and a device for rotating said core, and separate from the base of the robotic arm, the position of three target points on the core frame is measured in order to identify a first Cartesian frame of reference, referred to as the "core frame of reference", attached to the core frame, with respect to the location of the laser tacheometer station, and then a target, such as a corner cube, is fixed at the location of the robotic arm intended to receive the laying head, the robotic arm is moved in such a way as to successively position said target at three different points in space, and the position of said target is measured each time so as to identify, with respect to the same location of the laser tacheometer station, a second Cartesian frame of reference, referred to as the "robot frame of reference", attached to the robotic arm, and the robotic arm is calibrated in such a way as to superimpose the robot frame of reference with the core frame of reference, and thus make the orthonormal axes of said frames of reference coincide.

* * * * *